June 16, 1931.  J. M. DAILY  1,810,131
DEVICE FOR MIXING GASES AND LIQUIDS
Filed May 25, 1929
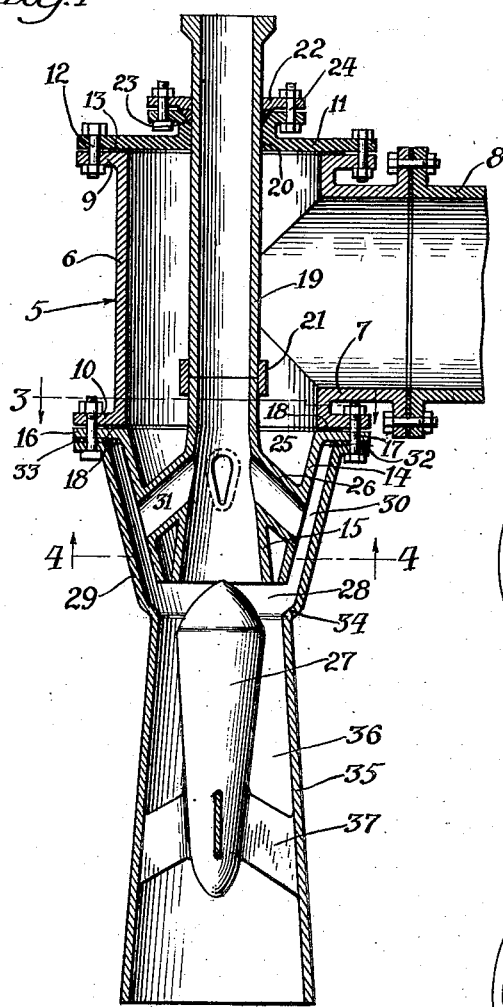
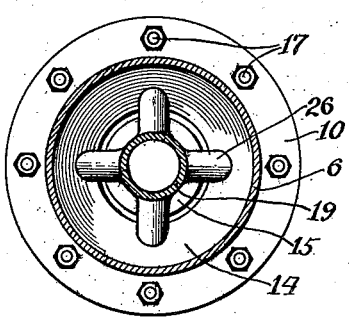
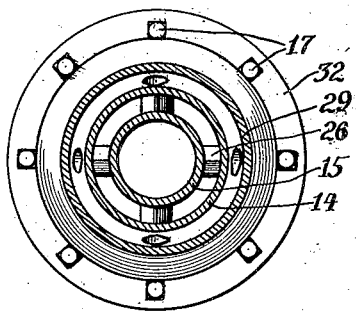
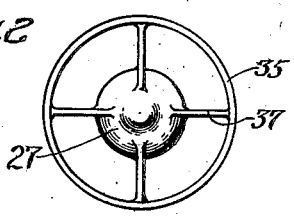
Inventor:
James Marlow Daily
By Fred Gerlach Atty.

Patented June 16, 1931

1,810,131

UNITED STATES PATENT OFFICE

JAMES MARLOWE DAILY, OF CHICAGO, ILLINOIS, ASSIGNOR TO AMERICAN OZONE COMPANY, OF CHICAGO, ILLINOIS, A CORPORATION OF ILLINOIS

DEVICE FOR MIXING GASES AND LIQUIDS

Application filed May 25, 1929. Serial No. 365,864.

The present invention relates generally to devices which are adapted for use in mixing ozone or ozonous air and water and in which the water is delivered under pressure and draws the ozone into contact or affiliation therewith by aspiration. More particularly the invention relates to that type of ozone and water mixing device which embodies (1) an elongated vertically extending pipe which has the upper end thereof connected to a source of ozone such, for example, as an ozonizer or generator, and its lower end open for discharge purposes, (2) an annular casing member which extends around the pipe and is connected at its upper end to receive water under pressure and which tapers toward the lower and discharge end of the ozone pipe and forms with the latter a tubular conduit, the side walls of which converge downwardly and thereby cause the water to be discharged or projected downwardly in a thin tubular stream having a relatively high velocity, and (3) a spreader which is arranged directly beneath the discharge end of the ozone pipe and operates to form an unobstructed substantially circular passage through which the ozone is drawn outwardly from the pipe into direct contact or affiliation with the inner peripheral part of the downwardly flowing thin tubular stream of water that is caused by the aforementioned conduit.

One object of the invention is to provide a mixing device which is more efficient in operation than devices of this type that have heretofore been proposed and used in that it embodies a second casing member which extends around the downwardly tapered water receiving member and forms an annular ozone chamber from which ozone or ozonous air is drawn inwardly into direct contact with the outer peripheral part of the downwardly flowing tubular stream of water that is caused by the conduit between the tapered casing member and the ozone pipe.

Another object of the invention is to provide an ozone and water mixing device of the aforesaid character, in which the downwardly tapered casing member and the lower or discharge end of the ozone pipe are held in connected relation by a plurality of hollow arms or braces which extend across the tubular water conduit and function not only to connect the said casing member and pipe but also to supply the annular chamber between the two casing members with ozone or ozonous air from the pipe.

A further object of the invention is to provide a mixing device of the type under consideration, in which the lower end of the second casing member has connected thereto an annular skirt which is flared downwardly and operates in conjunction with the lower end of the spreader to form for the ozone carrying water a tubular discharge duct the side walls of which diverge downwardly so as to permit the water to recover substantially its original potential energy or pressure.

A still further object of the invention is to provide an ozone and water mixing device which may be manufactured at a comparatively low cost, operates to effect a thorough and uniform commingling of the ozone and water and is an improvement upon that disclosed in an application for Letters Patent of the United States for improvements in "Devices for mixing gases and liquids" filed by me January 7, 1928, A. D., and serially numbered 245,089.

Other objects of the invention and the various advantages and characteristics of the present mixer construction will be apparent from a consideration of the following detailed description.

The invention consists in the several novel features hereinafter set forth and more particularly defined by the claims at the conclusion hereof.

In the drawings which accompanies and forms a part of this specification or disclosure and in which like numerals of reference denote corresponding parts throughout the several views:

Figure 1 is a vertical longitudinal sectional view of an ozone and water mixing device embodying the invention;

Figure 2 is an inverted plan or bottom view;

Figure 3 is a transverse section taken on the line 3—3 of Figure 1 and illustrating in detail the construction and arrangement of the hollow arms or braces which serve to connect the ozone pipe and the downwardly flared casing member and operate to supply ozone or ozonous air from the pipe to the annular chamber that extends around the aforesaid casing member; and Figure 4 is a transverse sectional view taken on the line 4—4 of Figure 1.

The invention is exemplified in a device which is adapted primarily for use in mixing ozone or ozonous air and water and comprises a T-fitting 5. The latter consists of a branch 6, and a branch 7 which has one end thereof joined to and in communication with the central portion of the branch 6. The fitting 5 is preferably arranged so that the branch 7 extends horizontally and the branch 6 extends vertically. The horizontally extending branch 7 is connected by a pipe 8 to receive under pressure from any suitable source, the water which is to be mixed with the ozone or ozonous air. The vertically extending branch 6 of the fitting 5 is provided at its upper end with a radially extending flange 9 and at the lower end thereof with a radially extending flange 10. The upper end of the branch 6 is closed by a circular plate 11 which is positioned adjacent the flange 9 and is secured to the latter by an annular series of bolts 12. A ring-shaped gasket or washer 13 is interposed between the flange 9 and the marginal part of the plate 11 for sealing purposes.

In addition to the fitting 5 the mixer comprises a vertically arranged annular casing member 14 and an ozone pipe 15. The casing member 14 tapers downwardly and is provided at its upper end with a radially extending flange 16. The latter is positioned adjacent the flange 10 of the branch 6 and is connected to the latter by an annular series of bolts 17. To prevent leakage of water between the flanges 10 and 16, a ring-like gasket 18 is provided. This gasket is interposed between the two flanges and is held in place in response to the clamping action of the bolts 17. The ozone pipe 15 is surrounded by the casing 14 and is arranged coaxially relatively thereto. It is connected by a pipe-section 19 to receive ozone from any suitable source of supply, such, for example, as an ozonizer or generator. The pipe-section 19 extends through a circular hole 20 in the central portion of the plate 11 and projects downwardly through the vertical branch 6 of the fitting 5. The lower end of the pipe-section 19 abuts against the upper end of the pipe 15 and is secured to the latter by a collar 21. To prevent leakage of water through the hole 20, a packing gland is provided. This gland comprises a follower 22 and a packing receiver 23 which is preferably formed as an integral part of the plate 11. The follower is adapted to be forced downwardly by bolts 24 to cause the packing to be jammed tightly in the receiver and against the pipe-section. The portion of the ozone pipe 15 that is enclosed or surrounded by the casing member 14 flares downwardly so as to form with said member a tubular water conduit 25, the sides of which converge downwardly so as to cause the water delivered into the fitting 5 through the pipe 8 to be discharged or projected downwardly in a thin tubular stream. The extreme lower end of the pipe 15 terminates adjacent the lower edge of the casing 14 and is spaced only a slight distance from the latter so that the stream of water projected therepast has a comparatively high rate of flow or velocity. The pipe 15 is connected and held in rigid relation with respect to the casing member 14 by braces 26 which extend across the conduit 25 and are so formed that their upper parts are of greater cross sectional area than their lower parts. A characteristic and an advantage of forming the braces of such conformation is that the water after passing downwardly around the braces reunites and hence is discharged from the conduit 25 in the form of a circumferentially continuous tubular stream. There are preferably four braces and these braces are formed integrally with the pipe 15 and the casing member 14.

An elongated vertically extending spreader 27 is positioned directly beneath and in spaced relation relatively to the lower edge of the ozone pipe 15. This spreader is arranged so that it is coaxial with the ozone pipe and the casing 14. The upper end of the spreader is conical in shape and operates in conjunction with the lower edge of the pipe 15 to form a substantially circular passage 28 which opens onto the inner peripheral part of the fast flowing tubular stream of water that is formed by and discharged from the conduit 25. As the tubular stream of water passes the passage 28, it exhausts the ozone from the pipe 15 and brings it into contact or affiliation therewith by aspiration. The diameter of the upper end of the spreader is slightly smaller than that of the lower end of the pipe 15 so that the stream of water will not strike thereagainst and splash upwards into the ozone pipe.

The invention contemplates increasing the efficiency of the mixer and effecting a complete and thorough commingling of the ozone and water, by supplying ozone to the outer peripheral part of the stream of water as well as the inner peripheral part. In furtherance of this end, a second or outer casing member 29 is provided. This member extends around and encloses the casing member 14. It tapers downwardly correspondingly to said casing member 14 and is spaced from the latter so as to form an annular chamber 30. The latter is adapted to receive ozone or ozonous air from the pipe 15 via openings or ducts 31 in the braces 26. The lower end of the chamber is open and faces the passages 28 so that the outer peripheral part of the stream may draw the ozone from the chamber 30 into contact or affiliation therewith as the stream is discharged downwardly. A characteristic and an advantage of utilizing and providing the annular ozone chamber 30 in addition to the passage 28, is that both the inner and outer peripheral parts of the tubular stream of water are subjected to a supply of ozone and consequently the mixing of the ozone and water is facilitated and the amount of ozone drawn into contact with the water is a maximum. The second casing member 29 is provided at its upper end with a radially extending flange 32. This flange is positioned adjacent the flange 16 so as to close the upper end of the ozone chamber 30. The casing member 29 is secured in its operative position by means of the bolts 17 which are arranged so that they extend through the flange 32. A ring-shaped gasket 33 is interposed between the flanges 16 and 32, to prevent leakage of ozone from the upper end of the chamber 30. The bolts 17 operate to connect together in rigid relation the T-fitting 5, the inner casing member 14, and the second or outer casing member 29. The lower end of said casing member 29 extends inwardly so as to form a shoulder 34. This shoulder operates to direct the ozone inwardly from the lower end of the chamber 30 into direct contact with the stream of water that is discharged from the conduit 25. The shoulder 34 is located adjacent the largest part of the upper or head end of the spreader 27 and is spaced from the latter a sufficient distance to permit the tubular stream of water to pass thereby without obstruction.

An annular skirt 35 is formed integrally with and depends from the lower end of the casing member 29. This skirt flares downwardly and is adapted to be connected in any suitable manner to a discharge pipe (not shown). The spreader 27 is positioned coaxially relatively to the skirt 35 and is located within the upper portion of the latter. It tapers downwardly so as to form with the skirt a tubular discharge or exhaust duct 36, the sides of which diverge downwardly. The duct 36 is adapted to receive the tubular stream of ozonous water after the latter has passed the passage 28 and the lower end of the chamber 30 and by virtue of its conformation or shape permits the water to recover substantially its original potential energy or pressure and to mix thoroughly with the ozone. The lower end of the spreader 27 is connected to and supported from the skirt 35 by means of braces 37. These braces extend radially across the exhaust duct 36 and are formed integrally with the spreader and the skirt 35.

Assuming that the pipe 19 is connected to receive ozone or ozonous air from an ozonizer or any other suitable source of supply and that the horizontally extending branch 7 of the T-fitting 5 is connected to receive water under pressure, the operation of the mixer will be as follows: The water entering the branch 6 through the pipe 8 will flow into the vertically extending branch 7 and be forced thence downwardly into the tubular conduit 25. The latter by reason of the fact that the walls thereof converge downwardly, causes the water to be discharged in a thin tubular stream that has a relatively high velocity. This stream as it passes the passage 28 and the shoulders 34, draws ozone or ozonous air from the pipe 15 and chamber 30 into contact therewith by aspiration. From the ozone receiving points the water which has mixed or affiliated therewith a maximum amount of the ozone or ozonous air flows downwardly into the exhaust duct 36 where it spreads and thoroughly commingles with the ozone and recuperates substantially its original potential energy.

The casing member 14, the hollow braces 26 and the ozone pipe 15 are preferably formed of a one-piece steel casting and are enamelled so as to prevent oxidation thereof due to their contact with the ozone. The second casing member 29, the skirt 35 and the spreader 27, together with the braces 37, are likewise formed of a one-piece steel casting and are enamelled both exteriorly and interiorly to prevent oxidation.

The mixer herein disclosed may be manufactured at a comparatively low cost for the reason that the various parts thereof may be formed of cast metal. It is extremely efficient in operation due to the fact that provision is made for subjecting the outer peripheral part as well as the inner peripheral part of the tubular stream of water to the ozone or ozonous air.

Although the mixer has been described as adapted for use in mixing ozone or ozonous air and water, it is to be understood that it can be used equally as well for mixing other gases and liquids. It is also to be understood that the invention is not to be restricted to the details set forth, since these may be modified within the scope of the appended claims, without departing from the spirit and scope of the invention.

Having thus described the invention, what I claim as new and desire to secure by Letters Patent, is:

1. In a mixer of the character described, the combination of a vertically extending casing member connected at the lower end thereof to receive liquid under pressure, a vertical pipe connected to a supply of gas and having its lower end projecting into the casing member and forming with the latter an annular liquid conduit which is restricted at its bottom end and serves to project the liquid downwardly in a thin annular stream, a hollow brace extending across the conduit and connecting the casing member and pipe, and means forming a gas chamber having a portion thereof opening onto and facing the outer peripheral portion of the annular stream of liquid so that the gas in the chamber may be drawn into contact with said outer peripheral portion of the stream, said chamber being connected to receive gas from the pipe through the hollow brace.

2. In a mixer of the character described, the combination of a vertically extending casing member connected at the lower end thereof to receive liquid under pressure, a vertical pipe connected to a supply of gas and having its lower end projecting into the casing member and forming with the latter an annular liquid conduit which is restricted at its bottom end and serves to project the liquid downwardly in a thin annular stream, the lower end of the pipe being open so that the gas in the pipe may be drawn into contact with the inner peripheral part of the stream, a hollow brace extending across the conduit and connecting the casing member and pipe, and means forming a gas chamber having a portion thereof opening onto and facing the outer peripheral portion of the annular stream of liquid so that the gas in the chamber may be drawn into contact with said outer peripheral portion of the stream, said chamber being connected to receive gas from the pipe through the hollow brace.

3. In a mixer of the character described, the combination of a vertically extending annular casing member connected to receive liquid under pressure and tapering downwardly, a vertically extending pipe connected to a supply of gas and having the lower end thereof projecting into the casing member and forming with the latter an annular liquid conduit which is restricted at its bottom end and serves to project the liquid downwardly in a thin annular stream, the lower end of the pipe being open so that the gas therein may be drawn into contact with the inner peripheral part of the stream, and a second casing member extending around and shaped correspondingly to the first mentioned casing member and spaced from the latter so as to form an annular gas chamber, the lower end of said second casing member extending downwardly beyond the lower end of the said first casing member and being shaped to direct the gas in the chamber inwardly into contact with the outer periphery of the annular stream of liquid.

4. In a mixer of the character described, the combination of a vertically extending annular casing member connected to receive liquid under pressure and tapering downwardly, a vertically extending pipe connected to a supply of gas and having the lower end thereof projecting into the casing member and forming with the latter an annular liquid conduit which is restricted at its bottom end and serves to project the liquid downwardly in a thin annular stream the lower end of the pipe being open so that the gas therein may be drawn into contact with the inner peripheral part of the stream, a second casing member extending around and shaped correspondingly to the first mentioned casing member and spaced from the latter so as to form an annular gas chamber, the lower end of said second casing member extending downwardly beyond the lower end of the said first casing member and being shaped to direct the gas in the chamber inwardly into contact with the outer periphery of the annular stream of liquid, and a hollow brace extending across the conduit and operating to deliver gas from the pipe to said chamber.

5. In a mixer of the character described, the combination of a vertically extending annular casing member connected at the upper end thereof to receive liquid under pressure, a vertical pipe connected to a supply of gas and having its lower end projecting into the casing member and forming of the latter an annular liquid conduit which is restricted at its bottom end and serves to project the liquid downwardly in a thin annular stream, a hollow brace extending across the conduit and having the ends thereof connected to and formed integrally with the casing member and pipe, and a second casing member extending around the first mentioned casing member and spaced from the latter to form an annular gas chamber, the lower end of said chamber opening onto and facing the outer peripheral part of the annular stream of liquid so that the gas in the chamber may be drawn into contact with said outer peripheral portion of the stream.

6. In a mixer of the character described, the combination of a vertically extending annular casing member connected at the upper end thereof to receive liquid under pressure, a vertical pipe connected to a supply of gas and having its lower end projecting into the casing member and forming with the latter an annular liquid conduit which is restricted at its bottom end and serves to project the liquid downwardly in a thin annular stream, a spreader disposed beneath and spaced from the lower end of the pipe and operative to form with the latter a circular passageway adjacent the restricted bottom end of the conduit and through which the gas in the pipe will be drawn into contact with the inner peripheral portion of the annular stream of liquid, a second annular casing member extending around the first mentioned casing member and spaced from the latter to form an annular gas chamber, said chamber having the lower end thereof opening onto and facing the outer peripheral portion of the stream of liquid so that the gas in the chamber may be drawn into contact with said outer peripheral portion of the stream, and an annular skirt depending from and connected directly to the lower end of the second casing member and enclosing the spreader.

7. In a mixer of the character described, the combination of a vertically extending annular casing member connected at the upper end thereof to receive liquid under pressure, a vertical pipe connected to a supply of gas and having its lower end projecting into the casing member and forming with the latter an annular liquid conduit which is restricted at its bottom end and serves to project the liquid downwardly in a thin annular stream, a spreader disposed beneath and spaced from the lower end of the pipe and operative to form with the latter a circular passageway adjacent the restricted bottom end of the conduit and through which the gas in the pipe will be drawn into contact with the inner peripheral portion of the annular stream of liquid, a second annular casing member extending around the first mentioned casing member and spaced from the latter to form an annular gas chamber, said chamber having the lower end thereof opening onto and facing the outer peripheral portion of the stream of liquid so that the gas in the chamber may be drawn into contact with said outer peripheral portion of the stream, and an annular skirt depending from and formed integrally with the lower end of the second casing member and enclosing the spreader.

8. In a mixer of the character described, the combination of a vertically extending casing member connected at the upper end thereof to receive liquid under pressure, a vertical pipe connected to a supply of gas and having its lower end projecting into the casing member and forming with the latter an annular liquid conduit which is restricted at its bottom end and serves to project the liquid downwardly in a thin annular stream, a spreader disposed beneath and spaced from the lower end of the pipe and operative to form with the latter a circular passageway adjacent the restricted bottom end of the conduit and through which the gas in the pipe will be drawn into contact with the inner peripheral portion of the annular stream of liquid, a skirt extending around the spreader and forming with the latter a discharge duct for the annular stream of water, and braces for centering the spreader with respect to the skirt, said braces extending across the discharge duct and being formed integrally with said spreader and skirt.

Signed at Chicago, Illinois, this 17th day of May, 1929.

JAMES MARLOWE DAILY.